Jan. 7, 1930.   A. J. REID   1,742,278
SCREW RETAINER FOR SCREW DRIVERS
Filed Feb. 6, 1929
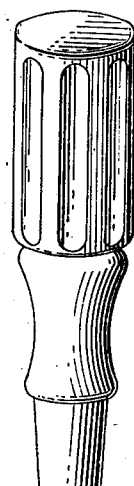
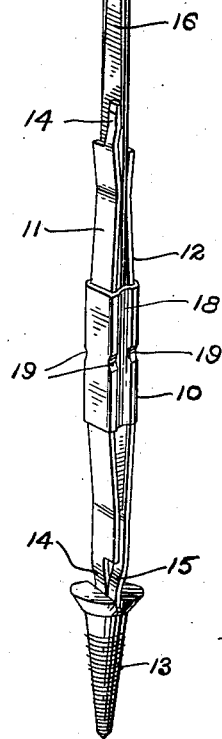
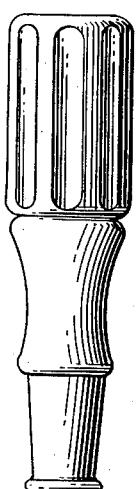
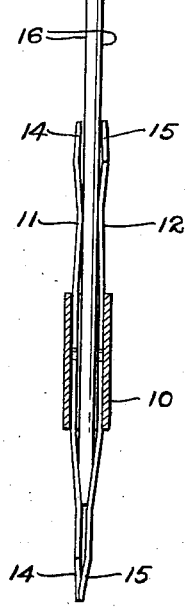
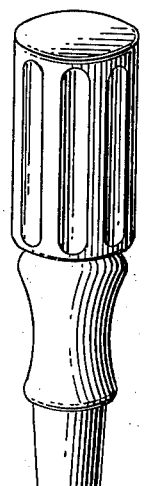
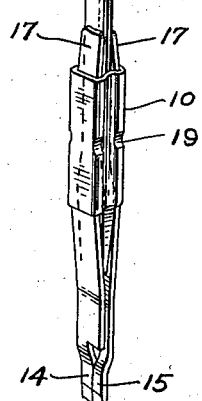
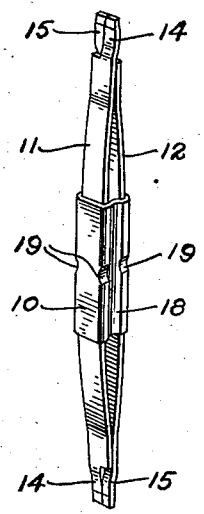
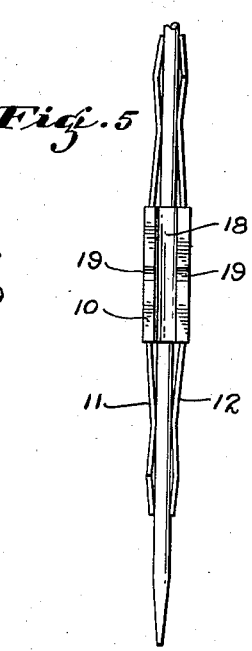
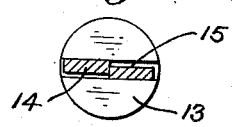
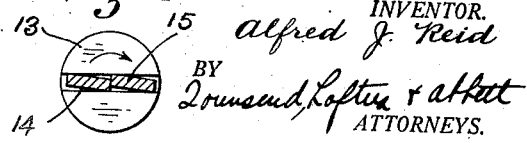
INVENTOR.
Alfred J. Reid
BY
Townsend, Loftus & Abbott
ATTORNEYS.

Patented Jan. 7, 1930

1,742,278

UNITED STATES PATENT OFFICE

ALFRED J. REID, OF SAN FRANCISCO, CALIFORNIA, ASSIGNOR OF ONE-HALF TO CHARLES N. BANFIELD, OF KENTFIELD, CALIFORNIA

SCREW RETAINER FOR SCREW DRIVERS

Application filed February 6, 1929. Serial No. 337,765.

My present invention relates to a new and improved screw retaining attachment for screw drivers.

An object of my invention is to provide a new and novel screw retaining device which is suitable for use with an ordinary screw driver.

A further object of my invention is to provide a device of the above character which may be moved out of an operative position upon the screw driver shank so that in use the screw driver and the screw retaining means may be always held together.

Another object of my invention is to provide a screw retaining attachment for screw drivers which will operate successfully with screws of different dimensions.

For a better understanding of my invention, reference should be had to the accompanying drawings, wherein I have shown by way of illustration preferred embodiments thereof.

In the drawings:

Fig. 1 is a perspective view showing my improved attachment mounted upon a screw driver and retaining a screw, Fig. 2 is a view in elevation showing my improved retainer partially in section, Fig. 3 is a perspective view showing a modified form of my improved screw retainer as mounted upon an ordinary screw driver, Fig. 4 is a perspective view of the screw retainer shown in Fig. 1, Fig. 5 is a fragmentary view showing the screw retainer illustrated in Fig. 1 as moved upon the screw driver shank into an inoperative position, and Figs. 6 and 7 are diagrammatic views illustrating the gripping action of my improved retainer.

In the several figures of the drawing, 10 designates the body member of my improved screw retainer. This body member 10 is shown as made of a short length of square tubing which is adapted to be slipped over the shank and bit of a screw driver. Secured within the body member 10 and projecting outwardly therefrom at each end I have provided two oppositely disposed, flat, resilient members which I have designated by the numerals 11 and 12. These resilient members 11 and 12 may be secured in the member 10 by a number of methods. In the present instance they are shown as clamped within the member 10 as will be pointed out hereinafter in connection with the description of Fig. 4. The members 11 and 12 are formed so that their extreme projecting ends will overlap and normally lie in the same plane so as to form a bit upon which, as shown in Fig. 1, a screw 13 may be held. This feature is accomplished by providing off-set portions 14 and 15 respectively at the opposite ends of the members 11 and 12. As a result of this arrangement, these members may be said to be right and left handed. In other words, they are similar in every respect except in the disposition of the off-set portions 14 and 15.

In Figs. 1 and 2 the shank of the screw driver is shown as having its opposite sides flattened as at 16. This is to facilitate a sliding of the screw retainer upon the shank into an inoperative position, as shown in Fig. 5. This flattening of the shank of the screw driver, as at 16, however, is not necessary but in some cases where the bit is flared so as to require a relatively large body member 10, it may be advisable for the purpose of providing a snug fit of the retainer upon the shank to construct it as shown in Fig. 3. In this particular embodiment, instead of providing both ends of the member 10 with screw retaining members, I provide at one end thereof a pair of shorter projecting members 17 having arcuate surfaces which engage the round shank and hold the member 10 centrally thereof and at the same time permit it to slide freely thereon.

By referring to Fig. 4 of the drawing, it will be seen that the members 11 and 12 are bowed toward each other so that their extending ends are pressed together. In order to hold these members in spaced relation, as shown, the sides of the member 10 lying therebetween are depressed or rolled in, as illustrated at 18, and to prevent axial displacement there is also provided in the edges of each of these members a recess into which a portion of the body member 10 may be also depressed as at 19. With such a construction it will be seen that the members 11 and 12 are held securely within the member 10 without resort to any further securing means.

In Figs. 6 and 7 I have illustrated the disposition of the off-set portions 14 and 15 as they engage the slot of the screw 13. When the retainer is placed upon the shank of the screw driver, as shown in Fig. 1, and the end of the retainer is placed in the slot of a screw, a slight pressure upon the screw driver handle will force the bit thereof downwardly between the outwardly extending members 11 and 12 and displace the portions 14 and 15 out of their normal plane, as shown in Fig. 6, where they will engage the sides of the screw slot and thus hold the screw thereupon. At this point, attention is directed to a feature of my invention not heretofore mentioned. This feature is in the disposition of the off-set portions 14 and 15. By arranging these portions of the retainer so that, when the screw driver is turned in a screw driving direction, the portions 14 and 15 will follow the screw driver blade in the direction of its rotation and so be further displaced backward therefrom, and thus the gripping action of the retainer upon the screw will be increased rather than diminished as would be the case if these extending portions 14 and 15 were placed so as to be pushed ahead of the blade in its rotation. This feature is well illustrated in Fig. 7, wherein it will be seen that as a turning pressure is brought to bear upon the screw slot in the direction indicated by the arrow, the members 14 and 15 will be twisted out of their normal plane and, as a result, the gripping action will be increased.

From the above, it will be seen that I have provided a new and novel screw retaining means which may be applied to a screw driver in a simple manner and one which is of such dimensions that it may be used in any position wherein a screw driver might successfully operate; and while I have illustrated and described embodiments of my invention which now represent the preferred form thereof, I desire to have it understood that in the appended claims I aim to cover all embodiments which fall within the spirit and scope thereof.

Having thus described my invention, what I claim and desire to secure by Letters Patent is—

1. A screw retainer for screw drivers comprising a body member having an opening extending axially therethrough into which the end of a screw driver may be placed, resilient members secured on opposite sides of said body member and extending outwardly therefrom so as to engage the cheeks of the screw driver bit, and edgewise off-set ends upon said resilient members adapted to lie in the same plane and engage the slot of a screw whereby when pressure is exerted upon the screw driver said ends will be disaligned so as to retain a screw thereupon.

2. A screw retainer for screw drivers comprising a body member into which the end of the screw driver may be placed, resilient members extending outwardly from each end of said body member having off-set ends which are adapted to engage the slot of a screw and grip the same, the off-set ends of said resilient members being arranged to trail that portion of the screw driver blade to which they are adjacent, whereby the gripping action upon the screw will be increased as the screw driver is turned, the retainer being so constructed that a screw driver may be projected through said body member between said resilient members and co-operate therewith to retain a screw upon the ends thereof.

3. A screw retainer for screw drivers comprising a body member into which the end of a screw driver may be placed, resilient members extending outwardly from said body member adapted to engage the slot of a screw and between which the bit of the screw driver may be placed to displace and retain a screw upon the ends thereof, said resilient extending members having edgewise off-set portions adapted to trail the screw driver blade, whereby said off-set portions will be distorted to increase the grip upon the screw when the screw driver is turned in a screw driving direction.

4. A screw retaining means for screw drivers comprising a pair of outwardly extending members between which the screw driver bit is adapted to lie, said outwardly extending members having edgewise offset ends which lie in the same plane which is that of the screw driver bit and adapted to be displaced out of this plane when the bit is forced therebetween, whereby a screw may be firmly held thereupon.

ALFRED J. REID.